(12) United States Patent
Johnson

(10) Patent No.: US 6,386,836 B1
(45) Date of Patent: May 14, 2002

(54) DUAL GEROTOR PUMP FOR USE WITH AUTOMATIC TRANSMISSION

(75) Inventor: Stephen D. Johnson, Hillsdale, MI (US)

(73) Assignee: Eagle-Picher Industries, Inc., Cincinnati, OH (US)

( * ) Notice: Subject to any disclaimer, the term of this patent is extended or adjusted under 35 U.S.C. 154(b) by 0 days.

(21) Appl. No.: 09/488,319

(22) Filed: Jan. 20, 2000

(51) Int. Cl.[7] ............... F04B 49/00; F04B 39/00; F04B 23/00; F01C 1/10; F01C 11/00
(52) U.S. Cl. ............... 417/310; 417/434; 417/440; 418/171; 418/200
(58) Field of Search ............... 417/310, 434, 417/440; 418/171, 200

(56) References Cited

U.S. PATENT DOCUMENTS

| | | | |
|---|---|---|---|
| 1,496,222 A | 6/1924 | Hill | |
| 1,648,730 A | 11/1927 | Hill | |
| 2,446,730 A * | 8/1948 | Wemp | 417/310 |
| 2,490,115 A | 12/1949 | Clarke | |
| 2,492,115 A | 12/1949 | Clarke | |
| 2,531,808 A | 5/1950 | Eames | 418/171 |
| 2,724,335 A * | 11/1955 | Eames | 417/310 |
| 2,813,488 A * | 11/1957 | Deska | 417/310 |
| 3,244,111 A * | 4/1966 | Shelhart | 418/171 |
| 3,551,081 A | 12/1970 | Brundage | 418/171 |
| 4,519,755 A | 5/1985 | Hanson | |
| 4,658,583 A * | 4/1987 | Shropshire | 418/10 |
| 4,960,370 A | 10/1990 | Obrist et al. | |
| 5,017,101 A * | 5/1991 | White | 417/310 |
| 6,195,990 B1 * | 3/2001 | Machesney et al. | 418/171 |

FOREIGN PATENT DOCUMENTS

| | | |
|---|---|---|
| DE | 3727633 A1 | 3/1989 |
| EP | 502 263 A1 | 9/1992 |

* cited by examiner

Primary Examiner—Charles G. Freay
Assistant Examiner—Timothy P. Solak
(74) Attorney, Agent, or Firm—Wood, Herron & Evans, LLP

(57) ABSTRACT

A dual gerotor pump is used for an automatic transmission. A dual gerotor pump which is driven by a central drive mechanism has a first chamber which continuously provides transmission fluid to the automatic transmission. The pump also has a second pumping chamber which selectively directs fluid to the automatic transmission when necessary. A valve mechanism is provided to divert fluid from the second pumping chamber back to the second pumping chamber so that it can recirculate thereby decreasing fluid pressure to the automatic transmission when it is not required.

8 Claims, 6 Drawing Sheets

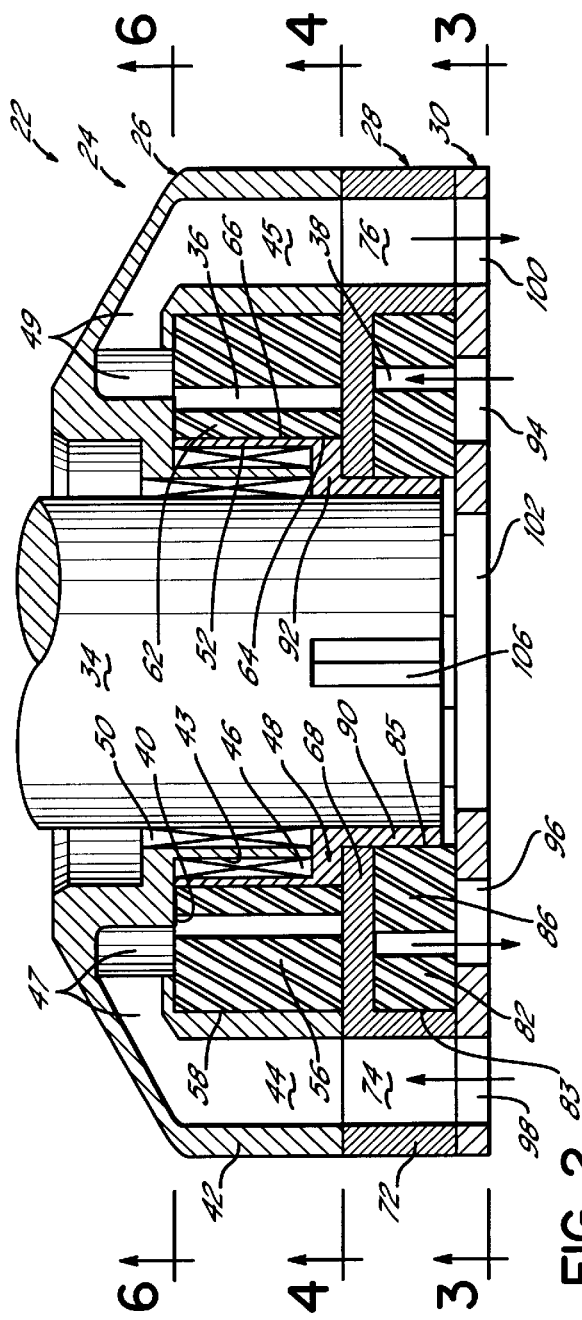
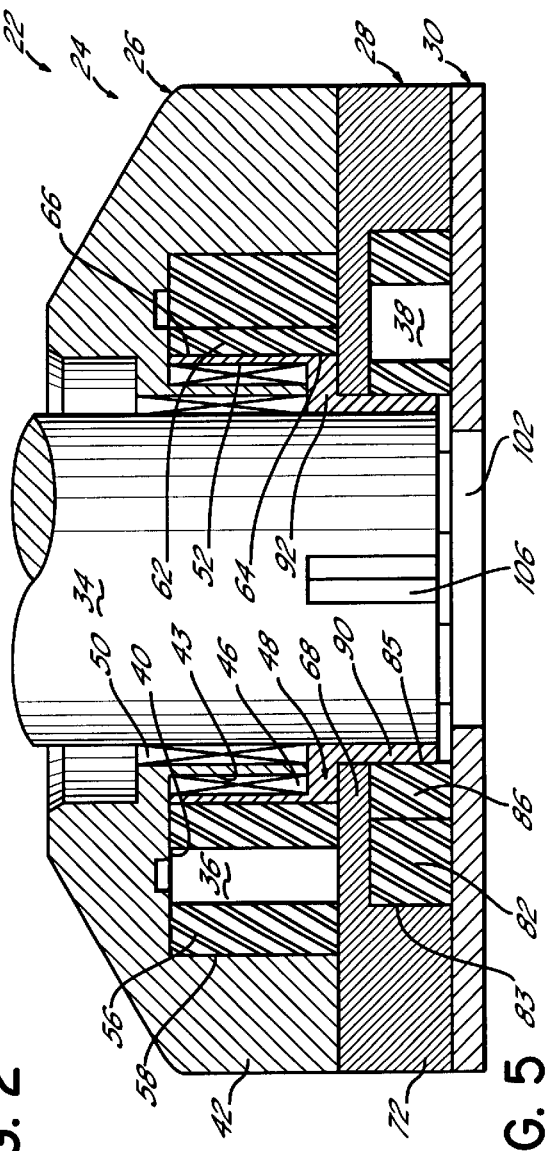
FIG. 2
FIG. 5

DUAL GEROTOR PUMP FOR USE WITH AUTOMATIC TRANSMISSION

Rotary or gerotor pumps have been used extensively in many different applications including automotive applications. Pumps such as those disclosed in Clark, U.S. Pat. No. 2,490,115, Obrist, U.S. Pat. No. 4,960,370, Brundage, U.S. Pat. No. 3,551,081 and Hill, U.S. Pat. No. 1,496,227 provide good pumping action powered by a central axis. Many of these pumps are specifically designed for automotive purposes.

A dual gerotor pump is a rotary pump which has two pumping chambers driven by the same shaft. These can be used in automotive applications with one pump pumping fluid to one vehicle system and a second pump pumping a second fluid to a second vehicle system.

In many applications the fluid pressure required is variable. An automatic transmission requires higher pressures under certain conditions such as during acceleration and lower pressures at other times. Driving at constant speed would require less. This is particularly true with continuous variable transmissions which utilize a belt and pulley system to vary the gear ratio. Such transmissions require a 60 to 800 psi difference.

SUMMARY OF THE INVENTION

The present invention is premised on the realization that a dual gerotor pump can be used to provide a wide range of fluid pressures for automatic transmissions and in particular constant variable transmissions. More particularly the present invention is premised on the realization that a dual gerotor pump having a primary pump constantly connected to the transmission and a secondary pump which can on demand be used to provide additional pressure to the transmission provides a superior range of pumping efficiencies for an automatic transmission of an automobile. By recirculating the fluid in the secondary pump when not needed, one can maintain optimum fluid pressure within the automatic transmission. Further, fluid pressure can be increased instantaneously when needed.

The objects and advantages of the present invention will be further appreciated in light of the following detailed descriptions and drawings in which:

BRIEF DESCRIPTION OF THE DRAWINGS

FIG. 2 is a cross-sectional view of the assembled gerotor pump of FIG. 1.

FIG. 5 is a cross-sectional view taken at lines 5—5 of FIG. 3.

DETAILED DESCRIPTION

Figure 1:
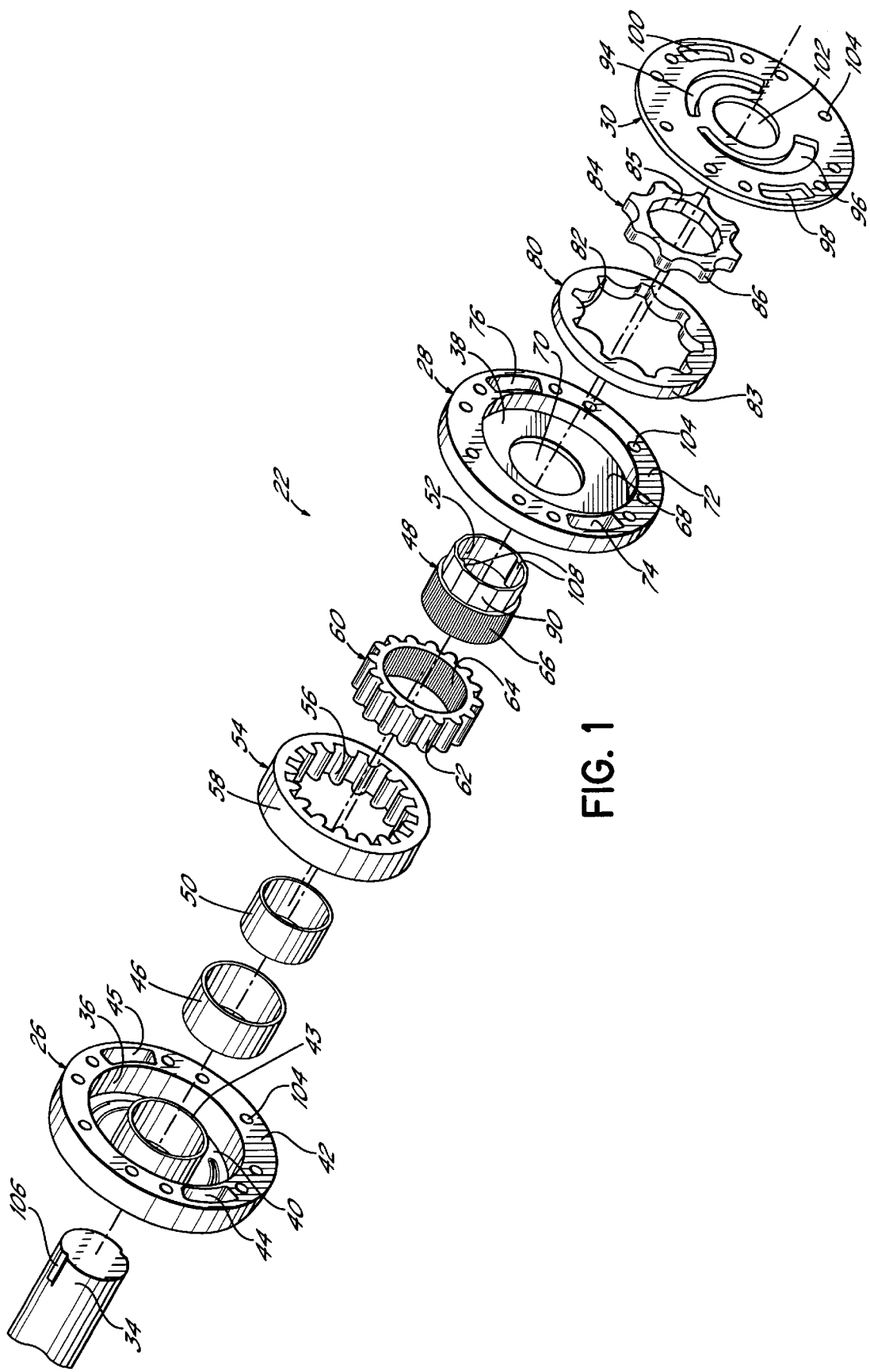
FIG. 1 is an exploded view of a dual gerotor pump of the present invention.
Figure 3:
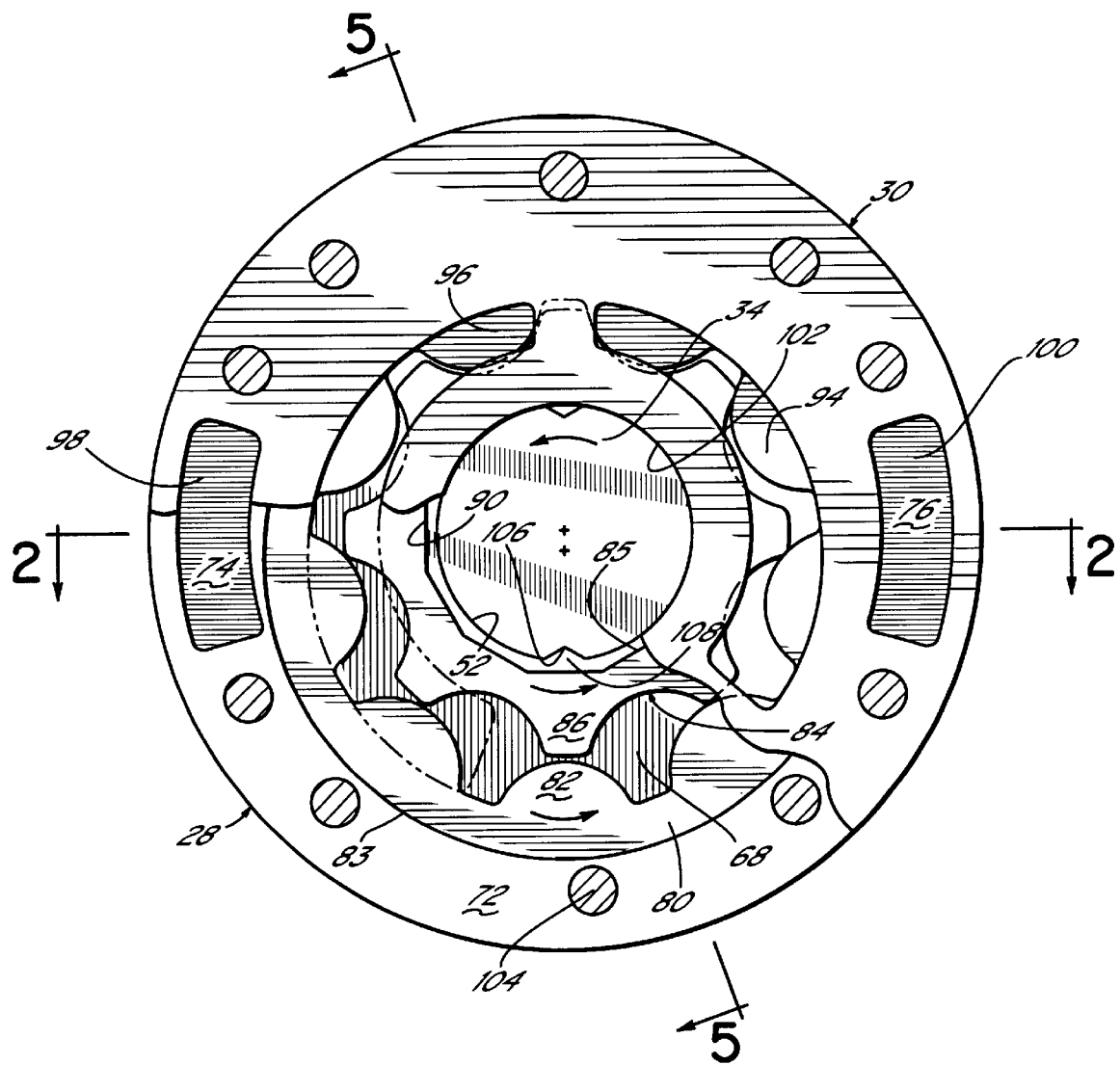
FIG. 3 is a cross-sectional view taken at lines 3—3 of FIG. 2.
Figure 4:
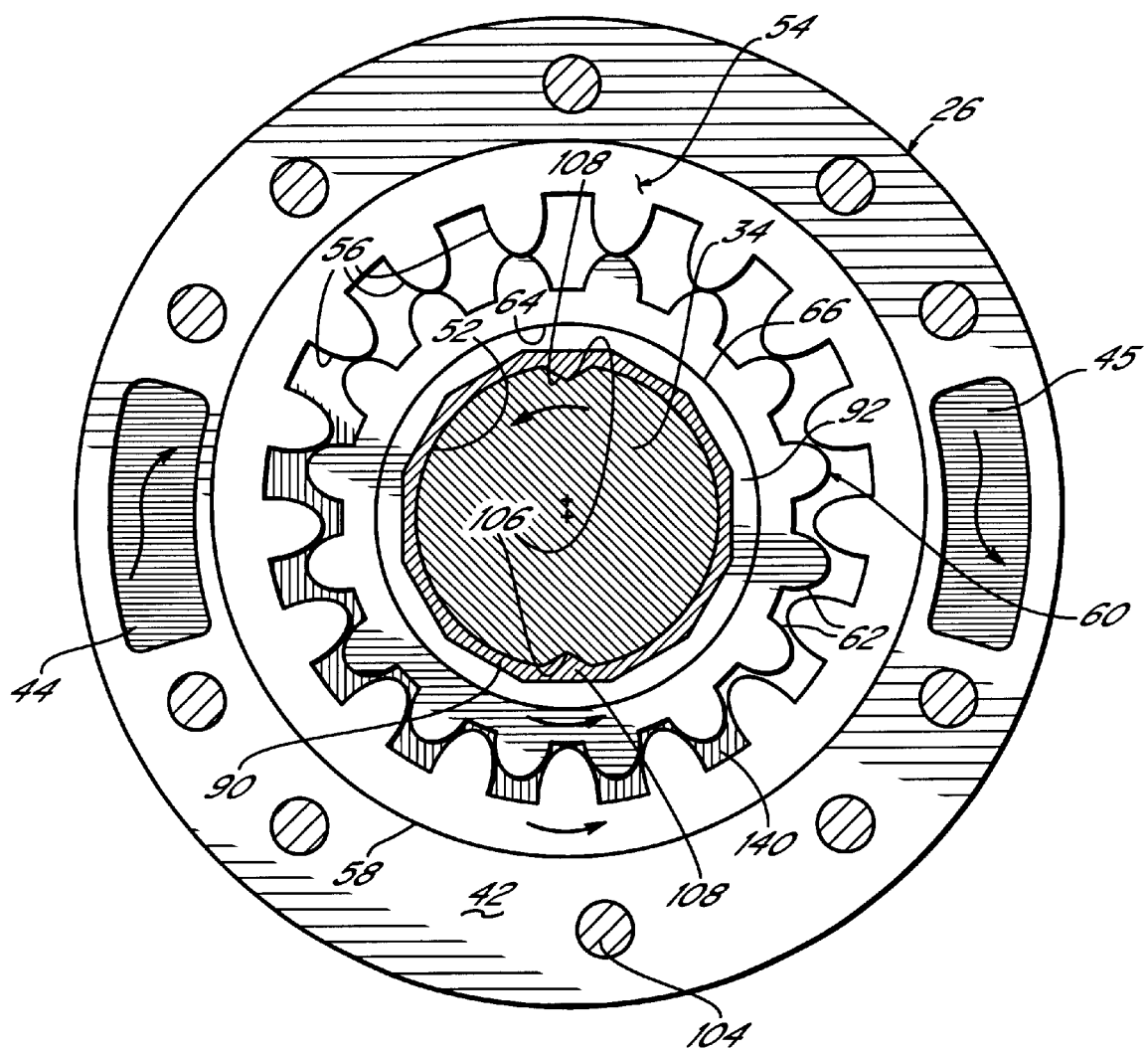
FIG. 4 is a cross-sectional view taken at lines 4—4 of FIG. 2.

As shown in FIGS. 1, 3 and 5, a pump 22 includes an outer housing 24 which includes an end casing 26, a central casing 28 and a sealing plate 30. This is operated by a central drive shaft or torque converter 34. First pump chamber 36 is within end casing 26 and the second pump chamber 38 is located in the central casing 28.

The first pump chamber 36 is defined by the bottom wall 40 of end casing 26 and the outer wall 42 of end casing 26. The outer wall 42 is relatively thick and includes an inlet passage 44 and a discharge passage 45. Bushing 46 rests in the first pump chamber 36 adjacent inner wall 43.

As shown in FIG. 2 the inlet and outlet passages 44 and 45 extend through the outer wall 42 to a bottom portion 47 and 49 of the end casing 26 and connect with the pumping chamber from the bottom section of the casing 26. Encircling bushing 46 is a stepped drive gear 48. Further separating the drive shaft 34 from the inner wall 43 of end casing 26 is inner bushing 50. The inner surface 52 of drive gear 48 rotates about bushing 46.

The first pump chamber 36 includes an internally toothed pump gear 54 having an external smooth surface 58 which mates with the interior surface of wall 42 of end casing 36. Positioned within the internally toothed gear is an externally toothed gear 60 which has teeth 62 which are designed to engage the internal teeth 56 of gear 54. Gear 60 has one fewer tooth than gear 54 thereby providing the pumping action as is explained hereinafter.

The stepped drive gear 48 has a externally toothed surface 66 which engages the inner surface 64 of gear 60 which mates with surface 66. Central casing 28 is bolted to end casing 26 with the bottom wall 68 of central casing 28 defining the top portion of the first pump chamber 36.

A portion 90 of stepped gear 48 in turn extends through a central hole 70 through end wall 68 into the second pump chamber 38. As with end casing 26, central casing 28 includes a thick exterior wall 72 which has an inlet passage 74 designed to communicate with inlet passage 44 and an outlet passage 76 designed to communicate with outlet passage 45.

Located in the second pump chamber 38 is an outer gear 80 which has a plurality of inwardly positioned teeth 82 and a smooth outer surface 83 which is designed to mate with wall 72. Likewise there is an inner gear 84 which has outwardly extended teeth 86. This inner gear 84 has an inner segmented surface 85 which mates with an exterior segmented peripheral surface 90 of step drive gear 48. Gear 48 likewise includes a small stepped portion 92 separating tooth portion 66 from segmented portion 90. Stepped portion 92 as shown in FIG. 2 rests against the bottom wall 68 of central casing 28 and seals the second pump chamber 38.

Sealing plate 30 covers the second pump chamber 38. Sealing plate 30 includes an inlet 94 into the second pump chamber 38 and an outlet 96 from this chamber. Further it includes an inlet 98 which is aligned with passage 74 and inlet 44 into the first pump chamber and likewise includes an opening 100 which aligns with passage 76 to outlet 45 from the first pump chamber. Thus as shown, both the inlet and outlets from the pump extend through the sealing plate 30 and further as shown the inlets and outlets of the respective first and second pump chambers are on opposite sides of the sealing plate to provide better balance for the pump.

Plate 30 likewise includes a central opening 102 which allows torque converter 34 to pass through. The end casings, central casings, and sealing plate are all held firmly together with bolts which extend through bolt holes 104.

Figure 6:
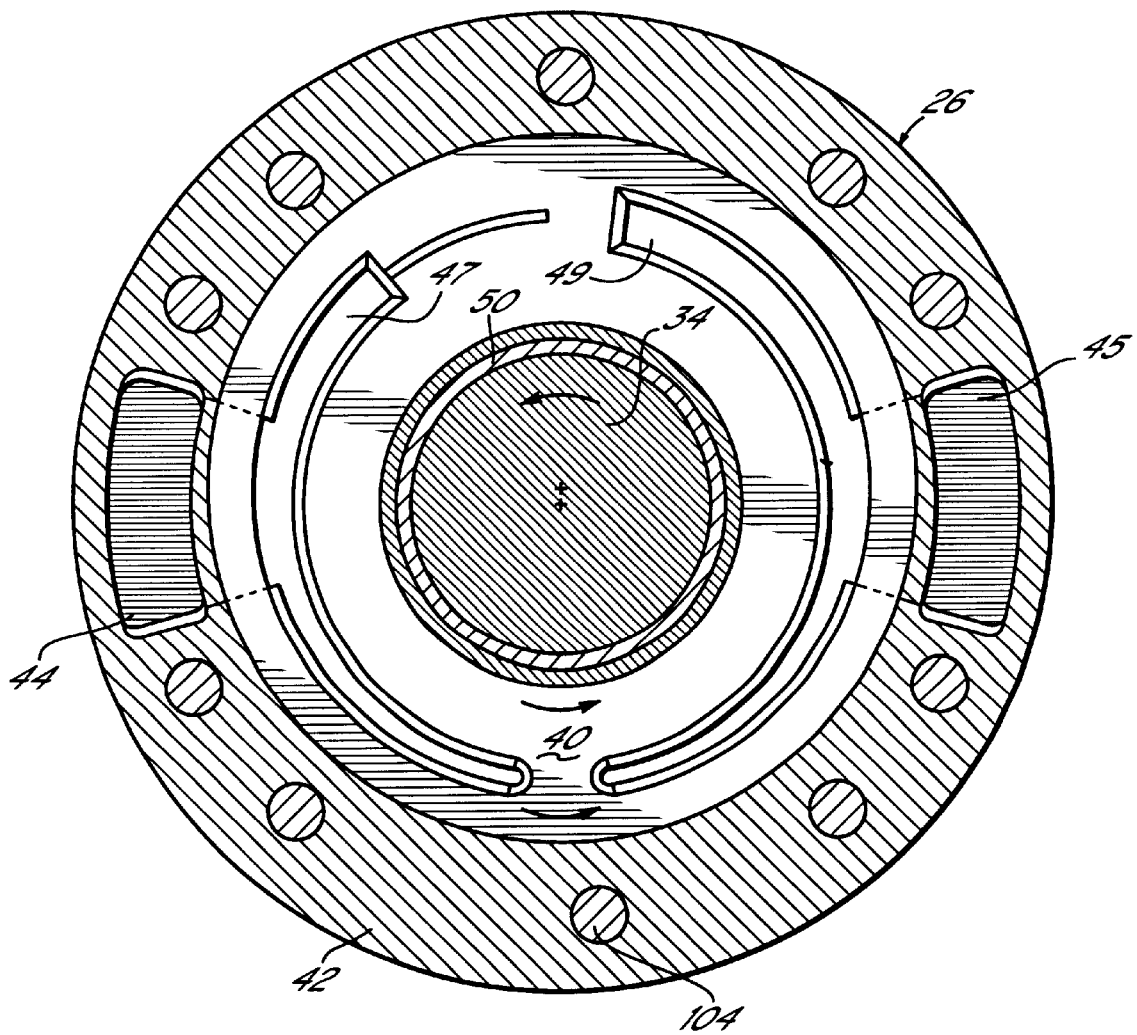
FIG. 6 is a cross-sectional view taken at lines 6—6 of FIG. 2.

As shown in FIG. 6, the torque converter 34 has two V-shaped channels 106 which are machined along the axis of the torque converter which are designed to mate with V-shaped raised portions 108 in the central surface of the stepped drive gear 48. Thus as the shaft 34 rotates the gear 48 rotates causing both pumps to rotate and pump fluid.

Figure 7A:
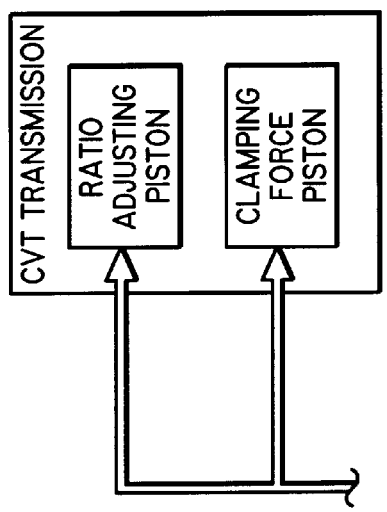
FIGS. 7, 7A and 7B are diagramatic depictions of the present invention.
Figure 7B:
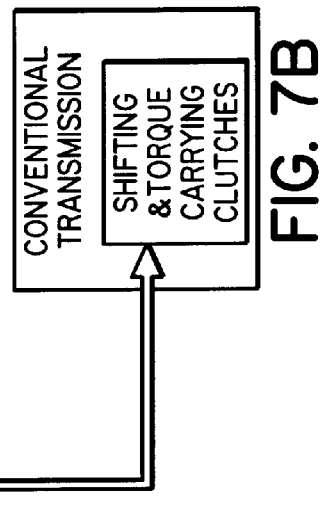
Figure 7:
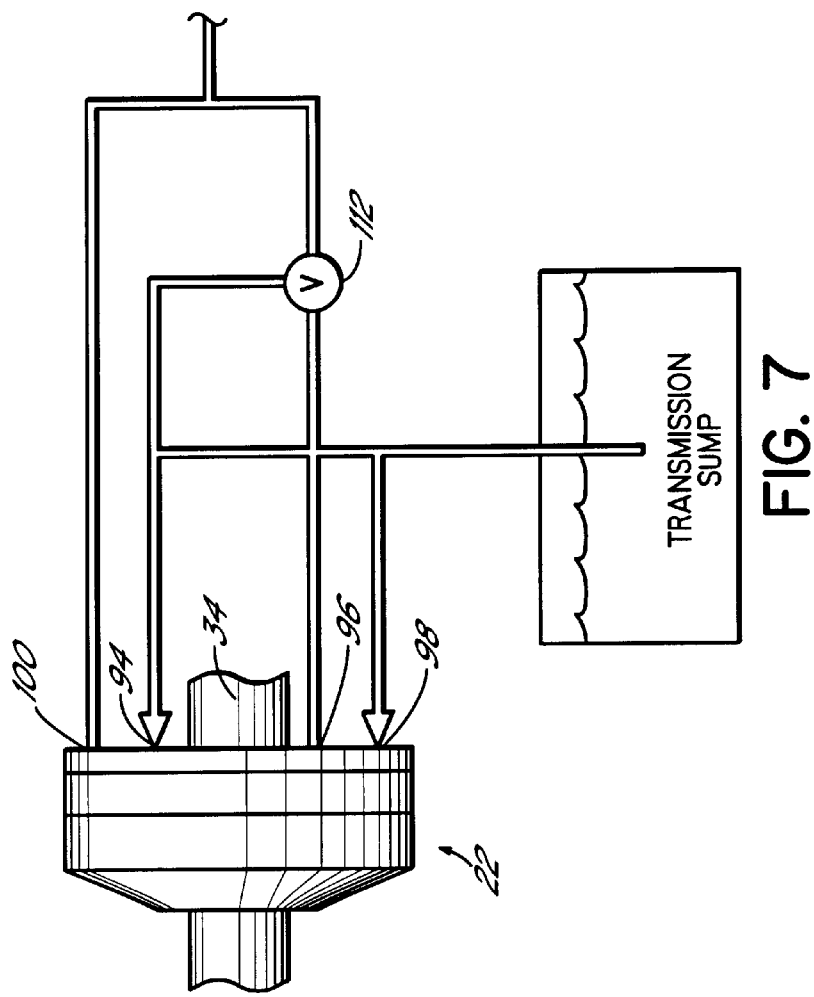

As shown diagrammatically in FIG. 7, the inlet and outlet passages from the primary pump chamber 98 and 100 are connected directly to the automatic transmission 110 maintaining the fluid pressure. This can be a CVT transmission as represented by FIG. 7A or a conventional transmission as represented by FIG. 7B. The inlet and discharge openings 96 from the secondary pump chamber communicate through a recirculation valve 112 which permits the fluid from the outlet to be directly passed back to the inlet or alternately to be directed to the automatic transmission, either that represented by FIGS. 7A or 7B.

In operation the shaft 34 is rotated which will in turn cause the stepped gear 48 to rotate. It will engage the toothed gear 60 causing it to rotate in the primary pump chamber and causing the inner toothed gear 54 to rotate. This will pull liquid in through inlet 44, force it out through discharge passage 58 and eventually through discharge port 100 into the automatic transmission 110. The gear 48 likewise will engage the inner surface 85 of gear 84 causing it to rotate and in turn rotating outer toothed gear 80. Likewise this will cause an expansion and contraction pulling fluid in through inlet 94 and forcing it out through discharge opening 96.

As represented in FIGS. 7, 7A and 7B, when the transmission 110 detects a need for additional fluid, recirculating valve 112 will cause direct fluid discharged through port 96 into the automatic transmission increasing the pressure as needed to achieve the desired pressure. Valve 112 can be adjusted to direct the fluid to recirculate through the secondary pump chamber. The valve 112 likewise can be opened partially to slightly increase pressure. Preferably it will be able to increase the pressure within the automatic transmission by up to 800 psi.

Thus by using the dual gerotor pump, the optimum fluid pressure within the automatic transmission can be maintained to provide for a smooth, efficient change in gear ratio. Further due to the nature of the pump, it is very compact which is particularly important in an automobile engine environment. The inlets and outlets of the two pump chambers being on opposite sides makes the pump more balanced. Thus all in all the pump of the present invention provides a very efficient mechanism to operate an automatic transmission and in particular a continuous variable transmission.

This has been a description of the present invention along with the preferred method of practicing the present invention.

However, the present invention should only be defined by the appended claims wherein we claim:

1. A dual gerotor pump comprising:
    a housing having a first pump chamber and a second pump chamber;
    a first gerotor pump in said first chamber;
    a second gerotor pump in said second chamber;
    a central axial drive gear adapted to drive said first and second pump;
    a first fluid inlet from a first side of said housing into said first chamber;
    a first fluid outlet from said first chamber through said first side;
    a second fluid inlet through said first side into said second chamber; and
    a second fluid outlet from said second chamber through said first side;
    wherein said housing is a first section and a second section said second section having a bottom wall wherein said first pump chamber is defined by said first section and said bottom wall and wherein said second pumping chamber is defined by said second section and said first side.

2. Dual gerotor pump claimed in claim 1 wherein said first fluid inlet and said first fluid outlet run through exterior walls of said housing.

3. The gerotor pump claimed in claim 2 wherein said first fluid inlet and said first fluid outlet extend around said first chamber and communicate with said first chamber from a backside of said chamber.

4. The gerotor pump claimed in claim 1 wherein said drive gear is a stepped drive gear.

5. An automatic transmission system adapted for use in a powered vehicle,
    said system comprising a pump system and an automatic transmission;
    said pump system comprising a first housing defining a first pumping chamber and a first gerotor pump in said first pumping chamber and a second housing defining a second pumping chamber and a second gerotor pump in said second pumping chamber;
    said first and second housings affixed to each other;
    a single drive member actuating said pumps;
    said first pump having an inlet port and a discharge port, both of which are connected to said automatic transmission;
    said inlet port and said outlet port of said first pump extending through said first and second housings;
    said second pump having an inlet port and an outlet port connected to said automatic transmission;
    a valve mechanism adapted to divert pump fluid from a discharge port of one of said pumps to an inlet port of said one of the said pumps thereby preventing fluid flow to said automatic transmission from said one of said pumps at a controlled rate.

6. The automatic transmission claimed in claim 5 wherein said first pumping chamber is larger than said second pumping chamber.

7. The system claimed in claim 6 further comprising a sealing plate having first and second openings corresponding to said first inlet and first discharge port and third and fourth openings corresponding with inlet and outlet ports of said second pumping chamber wherein the inlet port for said first pumping chamber is adjacent the outlet port for said second pumping chamber and wherein said outlet chamber for said first pumping chamber is adjacent said inlet port for said second pumping chamber.

8. The system claimed in claim 7 comprising a drive gear,
    said gear having a first large portion adapted to mate and drive said first pump and having a second smaller portion adapted to drive said second pump.

* * * * *